No. 629,622. Patented July 25, 1899.
C. H. SPERLE.
BICYCLE DRIVING GEAR.
(Application filed Apr. 27, 1899.)
(No Model.)

WITNESSES:
Edw. Thorpe
H. L. Reynolds

INVENTOR
Charles H. Sperle
by
ATTORNEYS.

THE NORRIS PETERS CO., PHOTO-LITHO., WASHINGTON, D. C.

UNITED STATES PATENT OFFICE.

CHARLES HENRY SPERLE, OF NEW YORK, N. Y.

BICYCLE DRIVING-GEAR.

SPECIFICATION forming part of Letters Patent No. 629,622, dated July 25, 1899.

Application filed April 27, 1899. Serial No. 714,740. (No model.)

*To all whom it may concern:*

Be it known that I, CHARLES HENRY SPERLE, of the city of New York, borough of Bronx, in the county of New York and State of New York, have invented a new and Improved Bicycle Driving-Gear, of which the following is a full, clear, and exact description.

My invention relates to an improvement in mechanism for applying power to a bicycle, and comprises the novel features which will be hereinafter described and claimed.

Reference is to be had to the accompanying drawings, forming a part of this specification, in which similar characters of reference indicate corresponding parts in all the figures.

Figure 1:
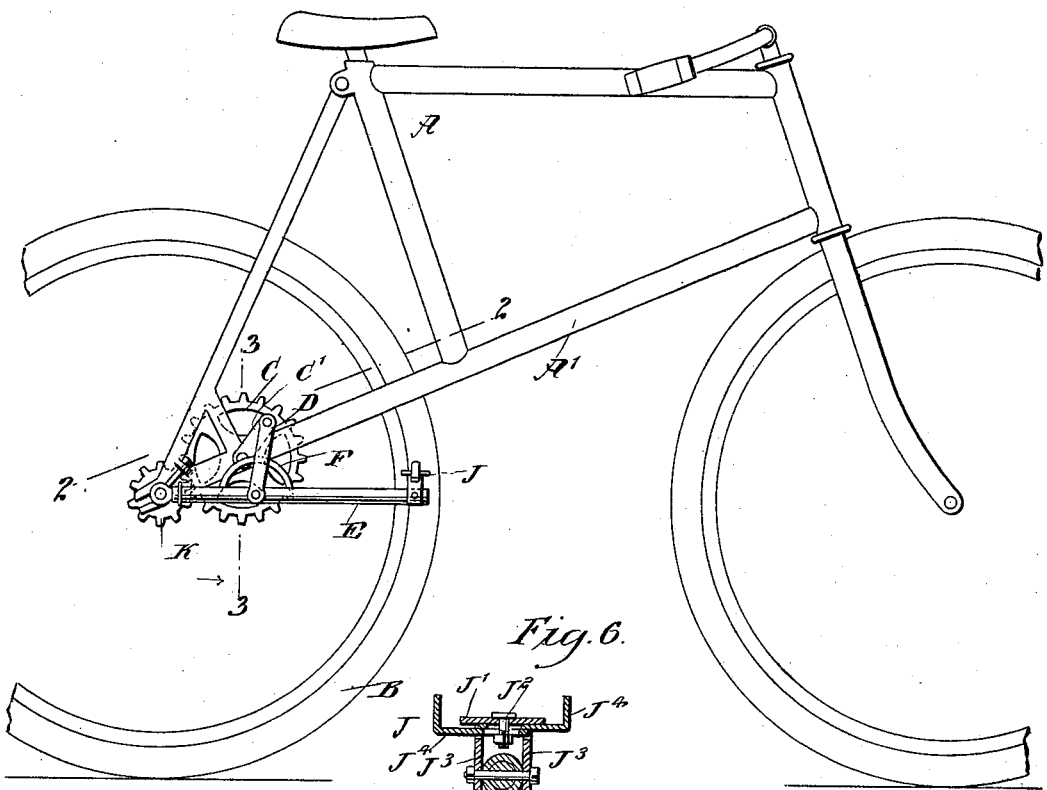
Figures 2, 3:
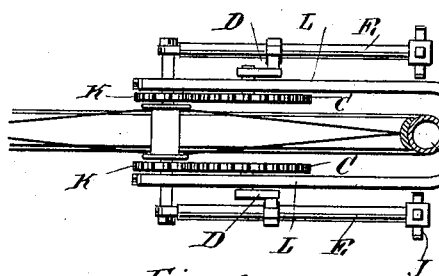
Figure 5:
Figure 6:
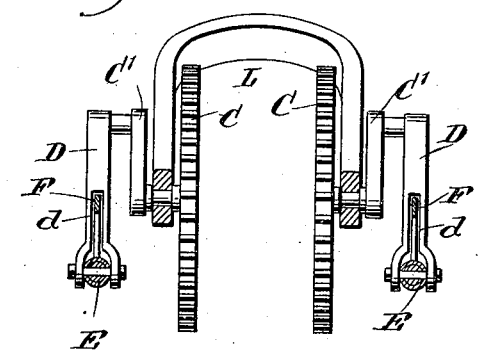
Figure 4:
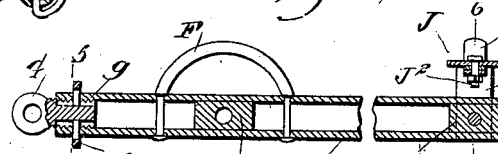

Figure 1 is a side elevation of a bicycle having my device applied thereto. Fig. 2 is a sectional plan view taken upon the line 2 2 of Fig. 1. Fig. 3 is a sectional elevation taken upon the line 3 3 of Fig. 1 and looking forward. Fig. 4 is a longitudinal sectional elevation taken through the lever which carries the pedal. Fig. 5 is a section taken on the line 5 5 of Fig. 4, and Fig. 6 is a cross-section of a pedal or foot-piece on the line 6 6 of Fig. 4.

My device consists of a driving mechanism in which the power is applied through the means of a lever to a crank which is secured to a gear-wheel, said gear-wheel meshing with a pinion upon the ground or driving wheel of the bicycle. The frame of the bicycle may be of any usual construction; but the construction herein shown is preferred as being the simplest.

In this construction the bar A' is extended from the lower portion of the head to the axle of the rear wheel, the rear portion of said bar being forked at L to embrace the sides of the rear wheel B. The upper portion of the frame is otherwise similar to the ordinary diamond frame. The levers E, of which two are used, one upon each side of the bicycle, are pivoted at their rear ends upon the axle of the rear wheel B or at any other suitable point on the frame of the bicycle. Each lever extends forwardly and has a pedal or foot-rest J secured to its forward end. The axle of the rear wheel B is provided with driving-pinions K, which mesh with gear-wheels C, journaled upon the frame forward of the axle of the wheel B. The wheels C are secured to shafts which carry cranks C', and the cranks are connected by means of pitmen D with the levers E. The pitmen D are forked at their lower ends and embrace the segment-arcs F, which are secured to the levers E. By this construction the levers E are given a firmer support and twisting of the levers is prevented.

The pivot for the rear end of each lever E is formed as a plug or bolt G, which is screwed into the rear end of the tube forming the lever E. By this means the length of the lever may be somewhat adjusted. In order to secure the bolt in place and prevent its working backward, the bolt is provided with longitudinal grooves or keyways g, and the tube E is provided with diametrically opposite grooves adapted to receive inwardly-curved ends of the bar H, formed of a small springy wire, whereby the bolt and the tube may be locked together.

When it is desired to adjust the length of the lever, the ends of the spring-bar H are sprung outward, so as to clear the bolt G. The bolt is then turned in the desired direction and the ends of the bar H are allowed to spring into the grooves in the bolt.

In order to furnish a better bearing for the pitman upon the lever E, a block I is placed within the same and provided with a hole adapted to receive the pin by which the pitman is pivoted to the lever. A similar block J' is placed within the forward end of this tube and receives the pin by which the pedal or foot-rest J is secured to the lever.

This form of construction is a very simple one and obviates the use of a chain. It is also of advantage by reason of the fact that the form of frame shown may be adopted and the weight thereby materially reduced. This effect is due partially to the design of the frame and partially to the fact that the seat may be carried farther to the rear, and the pedals J will be thus carried a sufficient distance to the rear, so that the space between the two wheels of the bicycle may be materially reduced, thus reducing the length of the frame. As the weight will be carried in larger proportion upon the rear wheel of the bicycle, the forward portion of the frame may be reduced in weight.

The foot-rests or pedals J, which are attached to the ends of the levers E, consist of a fixed plate J', which is supported by ears J³, which are pivoted to the lever, and adjustable bars J⁴, which have their outer ends turned up to form guards or clamps for the shoe-sole. The bars J⁴ pass beneath the plate J' and are slotted to receive a clamping-bolt J². By this means the space between the ends of the bars J⁴ may be adjusted to suit the width of shoe-sole.

Having thus fully described my invention, I claim as new and desire to secure by Letters Patent—

1. A bicycle driving-gear, comprising a pivoted lever, a crank having driving connection with the bicycle-wheel, and a pitman connecting the crank and lever, the pitman having two parallel parts and the lever having a segment-bar lying between the parts of the pitman, substantially as described.

2. A bicycle driving-gear, comprising a crank having driving connection with the bicycle-wheel, a lever having a bolt screwing into one end and having a pivot-bearing, and a pitman connecting the lever with the crank, said pitman being forked at the end connected with the lever, and the lever having a segment-bar lying between the forks of the pitman, substantially as described.

3. A bicycle driving-gear, comprising a pivoted lever, a crank having driving connection with the bicycle-wheel, a lever having a bolt screwing into one end and containing a pivot-bearing, said bolt having longitudinal grooves and the lever having holes adapted to register with said grooves, and a spring-pin adapted to enter said holes and grooves to lock the lever and bolt together, substantially as described.

CHARLES HENRY SPERLE.

Witnesses:
JNO. M. RITTER,
H. L. REYNOLDS.